United States Patent [19]
Guerette

[11] 3,827,573
[45] Aug. 6, 1974

[54] FOLDING CART
[75] Inventor: Marcel Guerette, Irrebonne, Quebec, Canada
[73] Assignee: Matthew Moody Limited, Terrebonne, Quebec, Canada
[22] Filed: Nov. 1, 1972
[21] Appl. No.: 302,790

[30] Foreign Application Priority Data
Nov. 18, 1971  Canada .............................. 128026

[52] U.S. Cl. ................ 211/149, 108/111, 280/36 R, 280/79.3
[51] Int. Cl. ............................................ B62b 11/00
[58] Field of Search ........... 211/182, 149, 134, 178; 280/79.3, 36 R, 33.99 R; 108/111, 112, 113, 115, 134; 5/100, 99 R

[56] References Cited
UNITED STATES PATENTS
2,762,699  9/1956  Watson .......................... 280/79.3 X
3,168,329  2/1965  Goldschmidt ............... 211/178 R X
3,191,959  6/1965  Heimbruch et al. .. 280/33.99 R UX
3,746,358  7/1973  Swick, Jr. et al. ............. 280/79.3 X FOREIGN PATENTS OR APPLICATIONS
754,962  3/1967  Canada .............................. 108/115
365,852  1/1932  Great Britain ..................... 108/111

Primary Examiner—William H. Schultz
Assistant Examiner—Robert W. Gibson, Jr.
Attorney, Agent, or Firm—Robert E. Mitchell; Alan Swabey

[57] ABSTRACT

A folding cart having a side frame with end frames hinged to the side frame and a pair of shelves hinged to the side frame.

6 Claims, 8 Drawing Figures

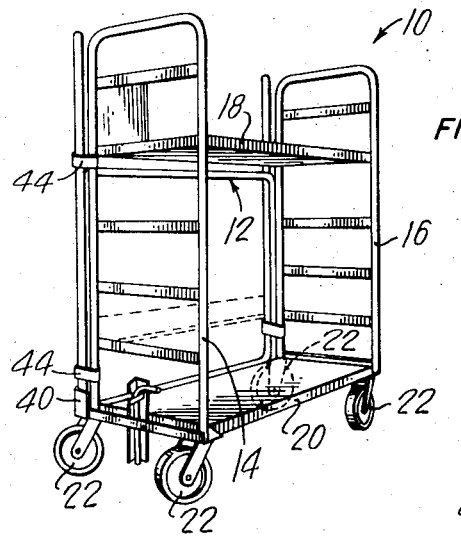
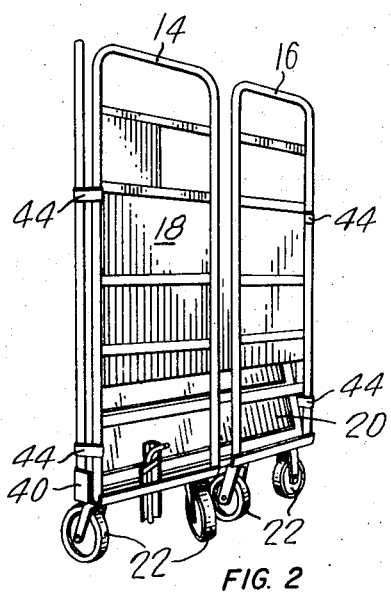
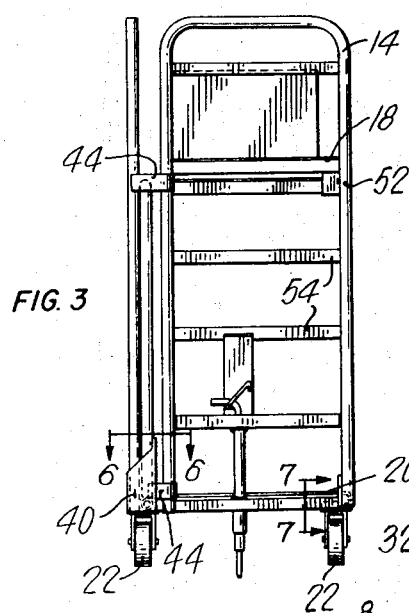
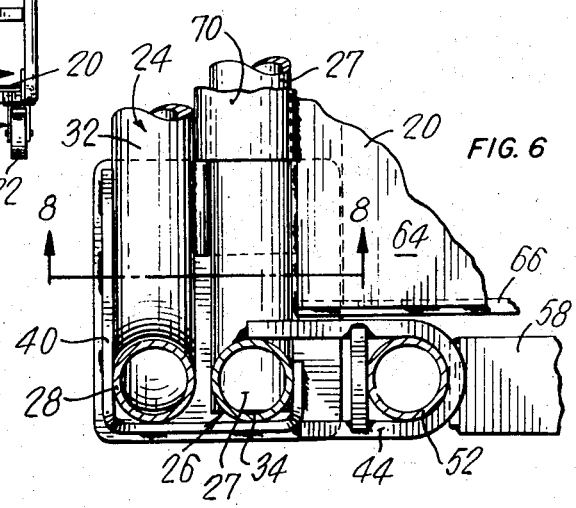

PATENTED AUG 6 1974

FOLDING CART

BACKGOUND OF INVENTION

1. Field Of Invention

The present invention relates to a unit truck or cart and more particularly to a unit truck which can be folded when not in use.

2. Description Of Prior Art

In the distribution of goods from wharehouses to retail stores, particularly chain stores, it has become the practice to load the goods on a cart or hand truck at the wharehouse; moving the loaded cart into a truck; moving the loaded cart from the truck into the retail store; and finally unloading the goods from the cart onto the display shelves of the store. These carts basically have two end frames with a pair of load supporting shelves between them which are opened to the sides and caster wheels are provided underneath. Once the carts were unloaded, they were brought back to the wharehouse empty.

The main disadvantage in such a system is in the handling of the empty carts. The carts must be returned to the wharehouse in trucks and they take up as much room as when the carts are full.

It has been proposed that such carts be made folding by hinging the shelves and end frames to the side frame. However, in order to strengthen the side frame, cross braces would be necessary and this would compromise the access on one side of the cart to the shelves. However, when bracing is not provided in the folding carts already known, the side frame may buckle readily since what is left is a substantially simple rectangular frame.

SUMMARY OF INVENTION

It is an aim of the present invention to provide a folding cart of the type mentioned in which the side frame is sufficiently sturdy, but wherein ample access is available on either side to the shelves.

A construction in accordance with the present invention includes a cart having a side frame, a pair of end frames hingedly connected to the side frame, and at least one shelf hinged to the side frame. The side frame includes a pair of oppositely facing U-shaped tubular members adjacent one another and defining an opening corresponding to the distance between the end frames and between the shelves.

In one embodiment of the present invention, the end frames are constructed with continuous tubular members and U-shaped hinge brackets are provided on the side frame, while the tubular members of the end frames are journaled in the hinge brackets.

BRIEF DESCRIPTION OF THE DRAWINGS

Having thus generally described the nature of the invention, reference will now be made to the accompanying drawings showing by way of illustration a preferred embodiment thereof, and in which:

FIG. 1 is a perspective view of the cart;

FIG. 2 is a perspective view of the cart shown in FIG. 1 in a folded condition;

FIG. 3 is an end elevation thereof;

FIG. 6 is a fragmentary horizontal cross section taken along lines 6—6 of FIG. 3;

DESCRIPTION OF PREFERRED EMBODIMENT

Figure 5:
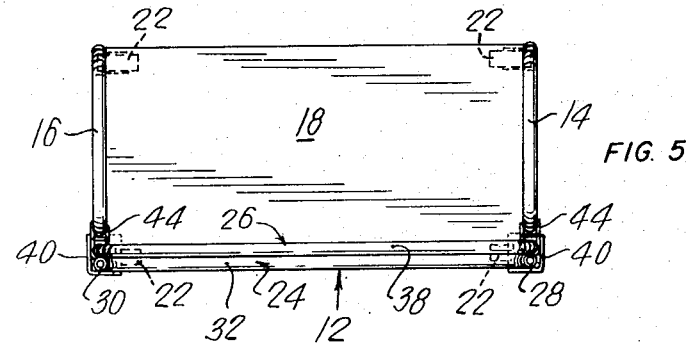
FIG. 5 is a top plan view of the cart.
Figure 4:
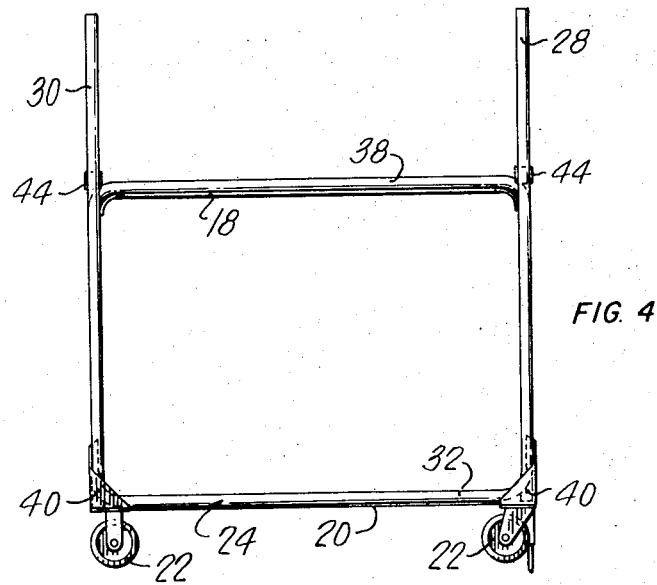
FIG. 4 is a side elevation of the cart taken from the rear of FIG. 1.

Referring now to the drawings, the cart is shown having a side frame 12, and end frames 14 and 16 are hinged to the side frame. Side shelves 18 and 20 are also hingedly mounted to the side frame 12 and wheels 22 are fixed to the bottom of the cart. In this case, a pair of wheels 22 are hinged to either end of the side frame 12, while the two other wheels 22 are mounted to the end frames 14 and 16.

In the prior art carts, the structure is similar to that described above; however, the side frame is normally made of welded box member construction with the end frame hingedly mounted to end members of the box member frame by means of conventional pin hinges.

It is obvious that such a construction of the side frame, whereby the elongated box members are welded at their corners to form the rectangular frame, would be susceptible to buckling under the rigorous conditions to which a cart of this type would normally be subjected.

In the present construction, the side frame 12 is made up of two adjacent U-shaped members 24 and 26 which are oppositely facing to form the rectangular opening for access to the cart. The tubular U-shaped members 24 and 26 are welded together at suitable locations. The tubular U-shaped member 24 includes a bight portion 32 and the legs 28 and 30 project upwardly thereof to the full extent of the cart.

From the drawings, it can be seen that the tubular member 24, for instance, is of continuous cylindrical tubular construction and the corners are formed by bending the tube, leaving a somewhat rounded corner. The resulting side frame 12, made up from the two U-shaped tubular members 24 and 26 with the rounded corners provide a solid frame structure which is considerably improved over the prior art side frame structure described above.

The U-shaped tubular member 26, which is of similar construction to the member 24, but in an opposite direction, includes a bight portion 38 and legs 34 and 36 which abut towards the bottom of the cart. A base tubular member 27 extends between the legs 34 and 36 of the U-shaped tubular member 26.

The end frames 14 and 16 are hingedly connected to the side frame 12. The end frame 14 includes a continuous cylindrical tubular member 52 with cross braces 54 extending between the legs thereof. The ends of the continuous U-shaped tubular frame member 52 terminate at a base cross bar 60.

Similarly, the end U-shaped frame member 16 includes a continuous tubular frame 56 with cross braces 54 between the legs thereof and the ends of the legs terminate at a base cross bar 62.

Referring to FIG. 6, a hinge bracket 44 which is made up of a flat bar bent into a U-shaped member with a semi-circular bight is welded to side frame member 12. The cylindrical tubular member 52 of the end frame member fits within the hinge bracket 44 as shown in FIG. 6.

A pair of hinge brackets 44 are provided at each end of the side frame member 12 as shown in FIGS. 1 and 2, for example.

The bottom corners of the side frame member 12 are reinforced by corner channels 40 and 42 as shown in the drawings.

Figure 8:
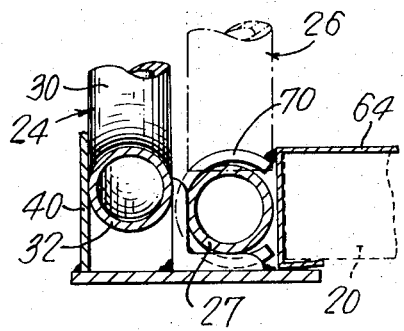
FIG. 8 is a vertical cross section taken along lines 8—8 of FIG. 6.

Each shelf 18 and 20 is pivotally mounted to the bight 38 and tubular member 27. Shelf 20 includes a hinge bracket 70 as shown in FIG. 8 which is C-shaped and welded to a flange of the shelf. Normally, shelf 20 would have two or more of the C-shaped hinge brackets 70 which surround the tubular member 27.

Shelf 18 is of the same construction as shelf 20. However, bight 38 serves as hinge pin passing through holes in end flanges 66 of platform 64.

Figure 7:
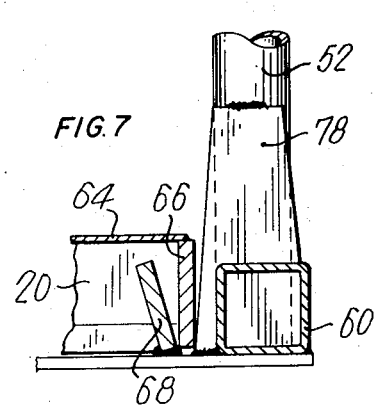
FIG. 7 is a fragmentary vertical cross section taken along lines 7—7 of FIG. 3.

Each shelf 18 and 20 includes a platform 64 with peripheral flanges. The side flanges are formed by bending down platform 64 while the end flanges 66 are flat members welded to platform 64. A hook-shaped seat 68 is provided on the end frame member as shown in FIG. 7 to receive the flange 66 of the shelf 18 or 20.

On one end frame member, for instance, end frame member 14, an anchor pin 72 can be provided which rides in an anchor pin sleeve 74 and is adjusted for height in anchor pin bracket 76. The anchor pin 72 is used when the cart is being transported in a truck, for instance, suitable tracks or holes are provided in the floor of the truck for receiving the anchor pin 72.

In use, the cart 10 is set up as shown in FIG. 1 and products can be loaded on both the shelves 18 and 20 and shipped to the retail store by means of a suitable transport truck. Once at the retail store, the products are unloaded from the shelves 18 and 20 of the cart 10 and the cart 10 is then ready for its return trip to the wharehouse. The shelves 18 and 20 are pivoted about their respective hinge axes and then the end frames 14 and 16 are closed inwardly over the folded shelves 18 and 20 as shown in FIG. 2. The folded cart is then reloaded into a truck and returned to the wharehouse.

I claim:

1. A cart comprising at least a side frame with a pair of uprights and at least a pair of horizontal members extending between the uprights; and end frame member hingedly connected to each upright; the uprights and horizontal members being formed by a pair of oppositely facing U-shaped members made up of continuous tubing each having a bight portion forming the respective horizontal members of the frame, and legs lying adjacent and connected to respective legs of the other U-shaped member forming the uprights with the adjacent legs in planes normal to the plane of the side frame and the continuous tubing forming arcuate corners between the respective legs and bight portion of each U-shaped member.

2. A cart as defined in claim 1, wherein U-shaped rigid straps forming hinge brackets are fixed to the uprights and each end frame includes at least cylindrically shaped bearing sections at least in the area of the hinge brackets and are journalled in the hinge brackets.

3. A cart as defined in claim 1, wherein caster wheels are mounted below each upright of the side frame and further caster wheels are mounted at the extreme bottom edge of the end frame members.

4. A cart as defined in claim 1, wherein the continuous tubing is of cylindrical cross-section.

5. A cart as defined in claim 1, wherein at least a shelf is hingedly mounted to one of the horizontal members formed by the bight of a U-shaped member, the shelf including downwardly extending end flanges at each end thereof adapted to engage a hook-shaped seat provided on the end frame members so that the shelf is in a horizontal position when the end frame members are in a position normal to the side frame member.

6. A cart as defined in claim 5, wherein a shelf is hingedly mounted to each horizontal member.

* * * * *